(12) United States Patent
Grover et al.

(10) Patent No.: US 12,449,087 B2
(45) Date of Patent: Oct. 21, 2025

(54) SPHERICAL JOINT WITH LEVELING AND PANNING CAPABILITY

(71) Applicant: Axon Enterprise, Inc., Scottsdale, AZ (US)

(72) Inventors: Benjamin A. Grover, Phoenix, AZ (US); Mark J. Eastwood, Scottsdale, AZ (US); James Blake Bullock, Gilbert, AZ (US); Daniel H. Orol, Phoenix, AZ (US)

(73) Assignee: Axon Enterprise, Inc., Scottsdale, AZ (US)

( * ) Notice: Subject to any disclaimer, the term of this patent is extended or adjusted under 35 U.S.C. 154(b) by 1002 days.

(21) Appl. No.: 17/411,576

(22) Filed: Aug. 25, 2021

(65) Prior Publication Data

US 2022/0065389 A1   Mar. 3, 2022

Related U.S. Application Data

(60) Provisional application No. 63/070,068, filed on Aug. 25, 2020.

(51) Int. Cl.
*F16M 11/14* (2006.01)
*F16C 11/06* (2006.01)
*G03B 17/56* (2021.01)

(52) U.S. Cl.
CPC ......... *F16M 11/14* (2013.01); *F16C 11/0604* (2013.01); *F16C 11/0647* (2013.01);
(Continued)

(58) Field of Classification Search
None
See application file for complete search history.

(56) References Cited

U.S. PATENT DOCUMENTS

| 206,393 | A | | 7/1878 | Ellinger | |
|---|---|---|---|---|---|
| 2,298,176 | A | * | 10/1942 | Schwartz | F16M 11/14 403/77 |

(Continued)

FOREIGN PATENT DOCUMENTS

| DE | 19521060 A1 | * | 12/1996 | ............. A61B 90/50 |
|---|---|---|---|---|
| DE | 10234271 A1 | * | 2/2004 | ............. F16M 11/14 |

(Continued)

OTHER PUBLICATIONS

Korean Intellectual Property Office, International Search Report for International Application No. PCT/US2021/047517 mailed Dec. 21, 2021.

(Continued)

*Primary Examiner* — Jonathan P Masinick
(74) *Attorney, Agent, or Firm* — H S. Malvich, Jr.; Andrew Terajewicz

(57) ABSTRACT

A spherical joint couples an accessory to a support. The spherical joint enables the accessory to be leveled about one or more axes and panned about an axis, such that the accessory may be leveled and panned with respect to a viewing sphere. The spherical joint comprises a collar, a cup, and a ball head, wherein the collar is configured to house the ball head and the ball head is configured to couple to one of an accessory or a support via a mount interface. The ball head further comprises a ball configured to enable rotation of the ball head relative to the collar with respect to one or more axes. The cup is configured to resist rotation of the ball head relative to the collar, such that the spherical joint may be fixed at a suitable orientation.

20 Claims, 6 Drawing Sheets

(52) U.S. Cl.
CPC ..... *G03B 17/561* (2013.01); *F16M 2200/022* (2013.01); *F16M 2200/024* (2013.01); *F16M 2200/042* (2013.01)

(56) References Cited

U.S. PATENT DOCUMENTS

| | | | |
|---|---|---|---|
| 3,186,736 A * | 6/1965 | Warshawsky | F16C 11/08 |
| | | | 285/264 |
| 5,957,445 A | 9/1999 | Hagman et al. | |
| 6,352,228 B1 | 3/2002 | Buerklin | |
| 7,152,834 B2 * | 12/2006 | Hsu | F21V 21/30 |
| | | | 248/230.1 |
| 7,300,028 B2 * | 11/2007 | Vogt | F16M 11/14 |
| | | | 403/114 |
| 8,910,914 B2 * | 12/2014 | Bigeh | H04R 1/08 |
| | | | 403/114 |
| 9,297,409 B2 * | 3/2016 | Kallas | F16M 11/041 |
| 9,940,802 B2 * | 4/2018 | Rosenkvist | F16M 13/02 |
| 10,082,726 B2 * | 9/2018 | Fagerkvist | F16C 11/06 |
| 10,125,918 B2 * | 11/2018 | Hoyda | F16M 13/022 |
| 10,322,764 B2 * | 6/2019 | Thomas | B62J 9/21 |
| 10,422,469 B2 | 9/2019 | Clark | |
| 10,954,995 B2 * | 3/2021 | Sugg | F16C 11/0623 |
| 10,962,167 B2 | 3/2021 | Karman et al. | |
| 11,098,840 B2 * | 8/2021 | Ye | F16M 11/16 |
| 2016/0081207 A1 | 3/2016 | Broadbent et al. | |
| 2017/0337789 A1 | 11/2017 | Rosenkvist | |

FOREIGN PATENT DOCUMENTS

| | | | | |
|---|---|---|---|---|
| DE | 102011013101 A1 * | 9/2012 | ........... | F16M 11/041 |
| EP | 2708792 A2 * | 3/2014 | ............. | F16M 11/14 |
| EP | 2708792 B1 | 7/2016 | | |
| EP | 3220036 B1 | 6/2018 | | |
| FR | 1466247 A * | 1/1967 | | |
| FR | 3051165 A1 * | 11/2017 | | |
| WO | 2019205960 A1 | 10/2019 | | |

OTHER PUBLICATIONS

European Patent Office, Extended European Search Report for International Application No. PCT/US2021/047517 mailed Sep. 20, 2024.

* cited by examiner

```
┌─────────────────────────────────────────────┐
│ PREVENT, BY FIRST LOCK, ROTATION OF CUP OR BALL │
│   HEAD RELATIVE TO COLLAR ABOUT AXIS        │
│                   705                       │
└─────────────────────────────────────────────┘
                      ↓
┌─────────────────────────────────────────────┐
│   APPLY FORCE ON CUP TO CREATE FRICTIONAL   │
│  FORCE BETWEEN CRADLE OF CUP AND BALL OF BALL│
│       HEAD TO RESIST MOVEMENT OF BALL       │
│                   710                       │
└─────────────────────────────────────────────┘
                      ↓
┌─────────────────────────────────────────────┐
│    PREVENT, BY SECOND LOCK, ROTATION OF BALL│
│      HEAD RELATIVE TO COLLAR ABOUT AXIS     │
│                   715                       │
└─────────────────────────────────────────────┘
                      ↓
┌─────────────────────────────────────────────┐
│   ENGAGE FIRST ENGAGEMENT SURFACE OF CLUTCH │
│   WITH SECOND ENGAGEMENT SURFACE OF CUP     │
│                   720                       │
└─────────────────────────────────────────────┘
                      ↓
┌─────────────────────────────────────────────┐
│  ROTATE CUP ABOUT AXIS IN DISCRETE ANGULAR  │
│ STEPS TO ADJUST ORIENTATION OF CUP RELATIVE TO│
│                  COLLAR                     │
│                   725                       │
└─────────────────────────────────────────────┘
                      ↓
┌─────────────────────────────────────────────┐
│ PREVENT, BY THIRD LOCK, ROTATION OF OTHER ONE│
│  OF CUP OR BALL HEAD RELATIVE TO COLLAR ABOUT│
│                   AXIS                      │
│                   730                       │
└─────────────────────────────────────────────┘
```

FIG. 7

SPHERICAL JOINT WITH LEVELING AND PANNING CAPABILITY

CROSS-REFERENCE TO RELATED APPLICATIONS

This application claims the benefit of U.S. Provisional Application 63/070,068, filed Aug. 25, 2020, which is hereby incorporated in its entirety.

FIELD OF INVENTION

Embodiments of the present invention relate to spherical joints with configurable degrees of freedom and pan capability.

BACKGROUND

Public safety personnel, such as police officers and firefighters use cameras to capture events, so that a video and/or audio record exist of what happened in an incident. These cameras may be mounted to vehicles such as cars and drones, and they may also be worn on the body as body worn cameras. Many mounts exist to mount cameras to vehicles. These mounts include fixed mounts and articulating mounts. Fixed mounts generally fix the orientation of a camera relative to a vehicle, while articulating mounts enable a camera to be articulated among various orientations relative to a vehicle. Articulating mounts may include an articulating joint that enables a user to select an orientation of the camera. A user may be unable to adjust or easily adjust the orientation of a camera that is mounted via a fixed mount, while a user may be able to adjust the orientation of a camera that is mounted via an articulating mount.

Automatic license plate reading (ALPR) systems use cameras to capture license plate data of nearby vehicles. The orientation of cameras in ALPR systems affects the performance of the system. A camera in a first orientation may capture different license plate data than a camera in a second orientation. Cameras that are mounted in ALPR systems via a fixed mount have a persistent orientation, while cameras that are mounted in ALPR systems via an articulating mount have a selectable orientation. Users may desire to orient a camera between a first orientation and a second orientation selected from a range of predetermined orientations.

BRIEF DESCRIPTION OF THE SEVERAL VIEWS OF THE DRAWING

Embodiments of the present invention will be described with reference to the drawing, wherein like designations denote like elements, and:

FIG. 7 is a flow diagram of a method for constraining rotation of a spherical joint system, according to one or more aspects described herein.

DETAILED DESCRIPTION

Figure 1A:
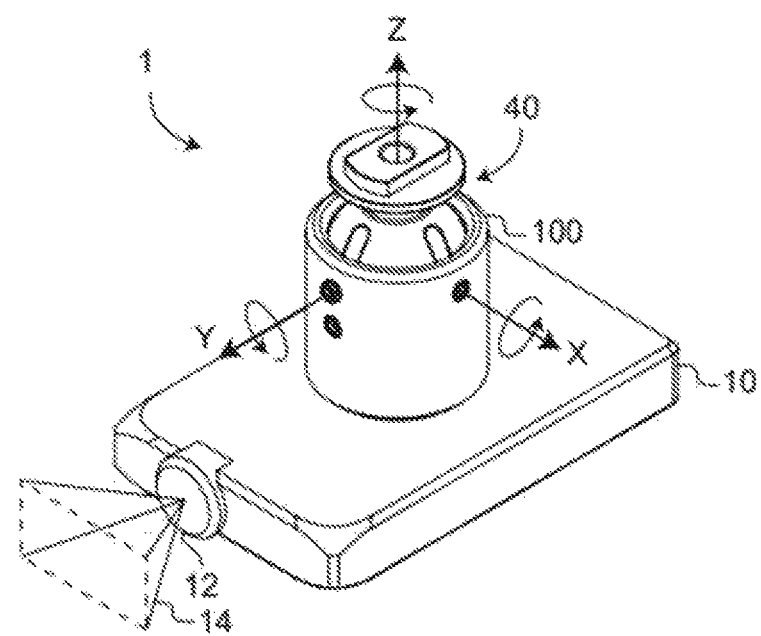
FIG. 1A is a front perspective view showing an implementation of a spherical joint system, according to one or more aspects described herein.

The detailed description of exemplary embodiments herein refers to the accompanying drawings, which show exemplary embodiments by way of illustration. While these embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected, or the like may include permanent, removable, temporary, partial, full, and/or any other possible attachment option. Additionally, any reference to without contact (or similar phrases) may also include reduced contact or minimal contact.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment.

Aspects of this disclosure relate to a spherical joint configured to couple an accessory (e.g., camera, recording device, microphone, etc.) to a support. The spherical joint may permanently or releasably couple to the accessory. The spherical joint may permanently or releasably couple to the support. Supports may comprise direct structures and intermediary structures to which the spherical joint couples to. Direct structures may include vehicles, windshields, frames, pillars, buildings, and other objects configured to support a spherical joint. Intermediary structures may include mounts, quick-release attachments, and other objects that are configured to couple to a direct structure.

A spherical joint may couple an accessory to a support, such as a direct structure or an intermediate structure. For example, a spherical joint may couple a camera directly to a frame of a vehicle. As another example, a spherical joint may couple a camera to an intermediate mount, which is in turn coupled to a windshield of a vehicle.

A spherical joint may comprise leveling capabilities and panning capabilities. Leveling capabilities may enable a provided accessory to be leveled about one or more axes. For example, a camera mounted to a windshield via a spherical joint may be leveled about one or more axes to ensure a field of view of the camera is level with a horizon. Leveling capabilities may enable a camera to be leveled within a viewing sphere. Panning capabilities may enable a provided accessory to be panned about an axis. For example, panning capabilities may enable a camera to be panned such that the horizontal orientation of the camera may be selected. Panning capabilities may enable a camera to be panned within a viewing sphere.

Figure 1B:
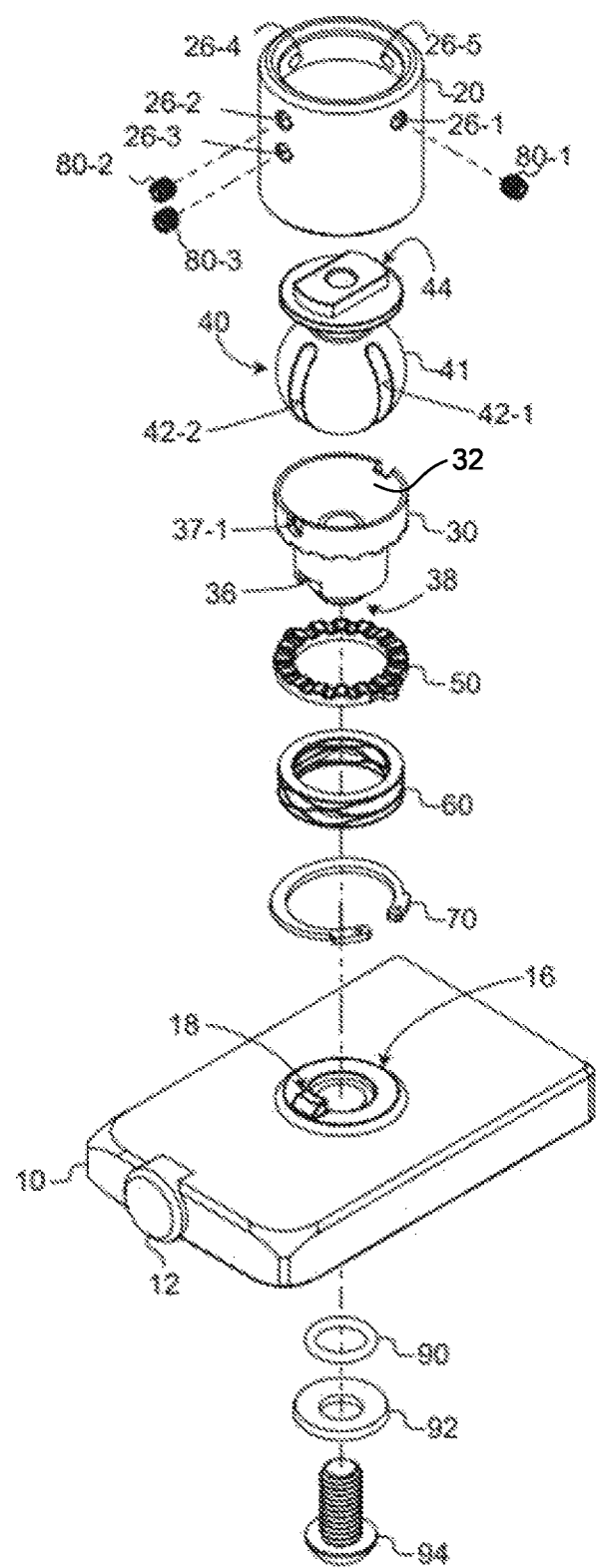
FIG. 1B is an exploded perspective view of the spherical joint system of FIG. 1A, according to one or more aspects described herein.

In various embodiments, and with reference to FIGS. 1A and 1B, a spherical joint system, such as system 1, for coupling an accessory to a provided support is disclosed. It should be understood by one skilled in the art that FIGS. 1A and 1B are an example illustration of system 1. In the example of FIGS. 1A and 1B, system 1 may comprise an accessory, such as camera 10 and a spherical joint 100. Spherical joint 100 may enable an orientation of camera 10 to be leveled and selectively panned.

In various embodiments, camera 10 may comprise an optical element, such as lens 12. Lens 12 may be configured to focus light on an image sensor within camera 10 for detection and subsequent processing into image data. Lens 12 may comprise a field of view, such as field of view 14. Field of view 14 may be fixed or variable. For example, lens 12 may comprise a fixed lens having a fixed field of view. As another example, lens 12 may comprise a zoom lens having a variable field of view.

In various embodiments, camera 10 may comprise a mounting interface configured to permanently or releasably couple camera 10 to spherical joint 100. The mounting interface may comprise a mechanical structure configured to engage spherical joint 100. For example, camera 10 may comprise a mounting interface 16 configured to couple camera 10 to a portion of spherical joint 100. Mounting interface 16 may comprise a portion of a keyed joint configured to couple rotation of camera 10 relative to the portion of spherical joint 100 to which camera 10 is coupled. The portion of the keyed joint may comprise one of a key and a keyway, a screw and a threaded region, and an element of any other mechanical pair configured to couple rotation between two components. For example, mounting interface 16 may comprise a key 18 configured to engage a keyway of the portion of spherical joint 100 to which camera 10 is coupled. For example, key 18 may be configured to engage joint keyway 36.

In various embodiments, one or more components of spherical joint 100 may be formed of one or more rigid, durable materials able to withstand force(s) applied to spherical joint 100 during use. For example, one or more components of spherical joint 100 may include one or more rigid, plastic materials, metal materials, and/or composite materials. The one or more rigid materials may include corrosion-resistant materials, UV resistant materials, and/or any other suitable material configured to at least partially withstand environmental factors. Rigid materials may include metals and metallic alloys (e.g., aluminum, steel, titanium, etc.), composites (e.g., fiberglass, carbon fiber, etc.), plastics (e.g., polycarbonate, acrylonitrile butadiene styrene, polyether ether ketone, etc.), and/or the like. The rigid materials may also be treated (e.g., heat-treated, galvanized, anodized, etc.), painted (e.g., powder-coated, e-coated, etc.), and/or similarly modified to aid in withstanding environmental factors.

In various embodiments, spherical joint 100 may comprise one or more components configured to cooperate with each other to control an orientation of a provided accessory with a provided support. For example, spherical joint 100 may comprise a collar 20 (e.g., sleeve, housing, etc.), a cup 30, and a ball head 40 (e.g., spherical head, etc.). Collar 20 may be configured to receive one or more other components. For example, collar 20 may be configured to house a portion or all of ball head 40. Ball head 40 may be configured to permanently or releasably couple to one of a provided accessory and a provided support via a mount interface, such as ball mount interface 44. Ball head 40 may be non-rotatably fixed to the provided support or the provided accessory via ball mount interface 44. Ball head 40 may comprise a ball 41 (e.g., sphere, etc.). Ball 41 may be engaged with collar 20 to enable rotation of ball head 40 relative to collar 20. Ball head 40 may be configured to rotate relative to collar 20 about a plurality of orthogonal axes, such as axis X, axis Y, and axis Z. For example, ball head 40 may be configured to rotate about a first axis, such as axis X (e.g., tilt, pitch, etc.), rotate about a second axis, such as axis Y (e.g., roll, etc.), and rotate about a third axis, such as axis Z (e.g., pan, yaw, etc.).

In various embodiments, collar 20 may be configured to house a portion or all of cup 30. Cup 30 may be configured to permanently or releasably couple to the other of the provided accessory and the provided support via a mount interface, such as cup mount interface 38. One or more fastening mechanisms (e.g., screws, bolts, adhesives, welds, etc.) may be used to secure each of cup 30 and ball head 40 to the respective provided accessory and support. For example, threaded fastener 94 may be configured to secure camera 10 to cup 30 via camera mount interface 16 and cup mount interface 38. Additional fastening elements may be implemented in securing camera 10 to cup 30, such as washers (e.g., spring washers, plain washers, lock washers, etc.), seals (e.g., gaskets, O-rings, etc.), adhesives (e.g., thread lockers, etc.), and other mechanical coupling aids configured to aid in securing camera 10 to cup 30. For example, threaded fastener 94 may couple washer 92 to camera 10 to distribute the load of threaded fastener 94 over a larger surface area. As another example, threaded fastener 94 may engage seal 90 with camera 10 to aid in preventing ingress of liquids and solids into camera 10.

In various embodiments, a portion of cup 30, such as cradle 32, may be configured to engage a portion of ball head 40, such as ball 41. Engagement between cradle 32 and ball 41 may produce a frictional force that resists rotation of ball head 40 relative to collar 20. Cradle 32 may comprise a concave shape. Cradle 32 may comprise a complementary shape relative to a shape of ball 41 of ball head 40. Cradle 32 may be sized to receive less than a hemisphere of a spherical shape of ball 41 of ball head.

In various embodiments, spherical joint 100 may comprise a biasing device configured to bias cup 30 toward ball head 40 to produce a frictional force between cradle 32 and ball 41. The biasing device may comprise springs such as spring washers (e.g., conical washers, wave washers, curved washers, etc.), coil springs (e.g., compression springs, conical springs, etc.), fluid springs (e.g., pneumatic valve springs, hydraulic springs, etc.), magnetic springs pairs, or any other suitable device configured to impart a force on cup 30 in a direction toward ball head 40. For example, spherical joint 100 may comprise biasing device 60. Biasing device 60 may be disposed within collar 20 and adjacent cup 30.

In various embodiments, biasing device 60 may provide a biasing force on cup 30, which is transmitted to ball 41 via cradle 32. The biasing force increases the frictional force between ball 41 and collar 20 and between ball 41 and cradle 32, thereby discouraging rotation of ball head 40 relative to collar 20. In various embodiments, the frictional force may be strong enough to prevent unintentional movement of ball head 40 relative to collar 20. The frictional force may be weak enough to allow a user to intentionally move cup 30 relative to collar 20 to adjust an orientation of cup 30 relative to collar 20 and ball head 40.

In various embodiments, a spherical joint may comprise a clutch configured to cooperate with a cup to enable the cup to rotate about a collar among discreet angular positions. A portion of the clutch may be configured to cooperate with a portion of the cup in regular intervals to allow the cup to rotate relative to the collar in discrete angular increments. For example, a portion of the clutch may comprise one or more magnets arranged to cooperate with one or more magnets arranged in a portion of the cup. In various embodiments, a clutch may comprise a clutch engagement surface, and a cup may comprise a cup engagement surface configured to engage the clutch engagement surface. The clutch engagement surface may correspond with (e.g., complement) the cup engagement surface. The clutch engagement surface and the cup engagement surface may form a complementary pair of surfaces. The clutch engagement surface and the cup engagement surface may each comprise a grouping of shapes configured to engage one another at regular rotational intervals. The grouping of shapes may include protrusions, depressions, ball plungers, detents, teeth, splines etc. For example, the clutch engagement surface may comprise a series of detents, and the cup engagement surface may comprise one or more ball plungers configured to cooperate with the series of detents. As another example, a clutch engagement surface may comprise a periodic (e.g., regular) shape, such as a set of teeth, that complements a respective periodic shape, such as a respective set of teeth of cup engagement surface.

Figure 5:
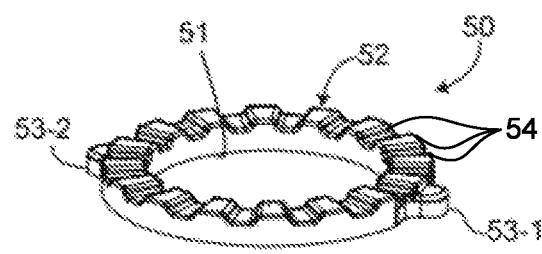
FIG. 5 is a front perspective view showing an implementation of a clutch of a spherical joint, according to one or more aspects described herein.

In various embodiments, and with further reference to FIG. 5, spherical joint 100 may comprise a clutch, such as clutch 50. Clutch 50 may be disposed adjacent cup 30. Clutch 50 may be disposed between biasing device 60 and cup 30. Clutch 50 may comprise a clutch engagement surface, such as clutch engagement surface 52. Clutch engagement surface 52 may be configured to cooperate with respective cup engagement surface 35 of cup 30 with further reference to FIG. 3. For example, cup 30 may comprise group of shapes 34 configured to engage a corresponding group of shapes 54 of clutch engagement surface 52. In embodiments, group of shapes 34 may comprise a first set of teeth and the group of shapes 54 of clutch engagement surface may comprise a second set of teeth complementary with the first set of teeth. Biasing device 60 may provide a biasing force on clutch 50, thereby encouraging engagement of clutch engagement surface 52 with cup engagement surface 35.

In various embodiments, clutch 50 may be fixedly coupled to collar 20 to prevent rotation of clutch 50 relative to collar 20. In example embodiments, clutch 50 may comprise one of a key and a keyway configured to cooperate with the other of the key and the keyway of collar 20 to prevent rotation of clutch 50 relative to collar 20. For example, clutch 50 may comprise one or more keys such as first key 53-1 (e.g., first clutch key 53-1) and second key 53-2 (e.g., second clutch key 53-2). First key 53-1 may be disposed opposite second key 53-2. One or more keyways of collar 20 may be configured to receive first key 53-1 and second key 53-2. For example, collar 20 may comprise first keyway 25-1 (e.g., first collar keyway 25-1) and second keyway 25-2 (e.g., second collar keyway 25-2) with further reference to FIG. 2B. Keyways 25-1/25-2 may be configured to receive keyways 53-1/53-2. Engagement of keys 53-1/53-2 with keyways 25-1/25-2 may prevent rotation of clutch 50 relative to collar 20. Engagement of keys 53-1/53-2 with keyways 25-1/25-2 may couple rotation of clutch 50 with rotation of collar 20.

In embodiments, each keyway of keyways 25-1/25-2 may comprise a length of travel. The length of travel may be oriented parallel to axis 21 of collar 20. A key of keys 53-1/53-2 may be selectively positioned within a respective keyway of keyways 25-1 or 25-2 at a position along the length of travel of the respective keyway. At a first position along the length of travel, the clutch 50 may be engaged with cup 30. At a second position along the respective keyway, the clutch may be disengaged from the cup 30. The second position may be disposed along the length of travel of the respective keyway, different from the first position. In embodiments, biasing device 60 may provide a biasing force to retain the key in the respective keyway at the first position. An external force may be applied via the cup or ball joint to overcome the biasing force and dispose the key in the second position along the keyway, thereby permitting rotation of cup 30 relative to clutch 50 and/or ball head 40.

In various embodiments, spherical joint 100 may comprise a retainer configured to retain one or more components in collar 20, such as cup 30, ball head 40, clutch 50, and biasing device 60. The retainer may comprise retaining rings such as crescent rings, housing rings, snap rings, spiral rings, or any other retainer configured to secure the one or more components in collar 20. For example, spherical joint 100 may comprise a retaining ring 70. Retaining ring 70 may be fitted into a groove in collar 20, such as groove 27 (e.g., collar groove 27) with brief reference to FIG. 2B) to retain components of spherical joint 100 in collar 20. Retaining ring 70 may be disposed adjacent biasing device 60 to provide a normal force on biasing device 60.

In various embodiments, components of spherical joint may be selectively engaged via a lock. The lock may engage the components along a first axis. The first axis may be orthogonal and/or perpendicular to a second axis. The first axis may be orthogonal and/or perpendicular to a third axis. The second axis may be orthogonal and/or perpendicular to the third axis. In embodiments, the first axis, the second axis, and the third axis may each respectively correspond to a different one of axis X, axis Y, and axis Z.

In embodiments, the lock may engage the components in a constrained position. In the constrained position, relative movement of at least one component of the components about at least one axis may be prevented. For example, rotation of the component about the second axis may be prevented. In the constrained position, rotation of the component about the first axis and/or the third axis may be permitted. For example, a lock engaged along axis X may prevent movement about axis Z in the constrained position. Movement about the axis Y may be permitted in the constrained position. In embodiments, the movement in the constrained position may be permitted (e.g., enabled) by the lock in accordance with an orientation of a groove or indentation of the lock that permits movement of a protrusion along the groove or indentation about one axis, but not across the groove or indentation about the other axis. The constrained position may prevent movement about the at least one axis but not movement about another axis.

In embodiments, the lock may engage the components in an unconstrained position. In the unconstrained position, rotation of the at least one component of the components about the at least one axis may be permitted. For example, rotation about the second axis may be permitted. In the unconstrained position, rotation of the component about the third axis may be permitted. In the unconstrained position, rotation of the component about the first axis may be permitted.

In embodiments, the lock may engage the components in an engaged position and a disengaged position. The components may be selectively disposed between the engaged position and the disengaged position in accordance with a configuration (physical movement, change in position, change in configuration, etc.) of at least one element of the lock. The components may be placed in the engaged position from the disengaged position in accordance with an adjustment applied to the lock. The components may be placed in the disengaged position from the engaged position in accordance with the adjustment. The components may be further placed in the engaged position from the disengaged position in accordance with another, further adjustment applied to the lock.

In the engaged position, relative movement of at least one of the components about at least one axis may be prevented. For example, rotation of the components about the second axis may be prevented. The at least one axis may comprise at least two axes. For example, rotation of the components about the third axis may be further prevented. In the engaged position, rotation of the components about the first axis may be permitted. For example, a lock engaged along axis X may prevent movement about axis Z in the engaged position. The lock may further prevent movement about axis Y in the engaged position. Movement about axis Z may be permitted in the engaged position. In embodiments, the movement in the engaged position may be permitted (e.g., enabled) by the lock in accordance with engagement between different elements the lock. For example, a set screw received in a groove of a ball head along one axis may prevent movement about at least one other axis. The set screw engaged with a surface of a ball head along the one axis may prevent movement about the other two axes.

In the disengaged position, rotation about the at least one axis may be permitted. For example, rotation of the components about the second axis may be permitted. In the disengaged position, rotation of the components about the third axis may be further permitted. In the disengaged position, rotation of the components about the first axis may remain permitted. In embodiments, the engaged position may prevent movement of a component about at least two axes but not movement about another axis. In the disengaged position, movement about the at least two axes may be permitted. In the disengaged position and the engaged position, the movement about the axis along which the lock is engaged may be permitted. The engaged position may comprise a constrained position. The disengaged position may comprise an unconstrained position. Each of a constrained position and an engaged position of components engaged via a lock may be employed in embodiments according to various aspects of the present disclosure to prevent movement about at least one axis.

In embodiments, a lock may comprise one or more elements configured to selectively engage two or more components. The lock may comprise a at least two elements (e.g., a pair). The lock may be associated with a direction movement. For example, a lock associated with leveling an accessory in a vertical orientation or rotational orientation may comprise a leveling lock or leveling pair. Alternately or additionally, a lock associated with preventing movement in a horizontal orientation may comprise a locking pair. In embodiments according to various aspects of the present disclosure, a spherical joint may comprise multiple locks (e.g., first lock, second lock, third lock, etc.). The spherical joint may comprise multiple locks along one axis of engagement (e.g., a fourth lock opposite a first lock).

In various embodiments, spherical joint 100 may comprise one or more leveling pairs (e.g., locks) configured to limit (e.g., restrict, prevent, guide, etc.) movement of ball head 40 relative to collar 20. A leveling pair may comprise two or more complementary elements on different components. A leveling pair may be engaged to preclude movement of the different components in one or more directions perpendicular to an axis along which the level pair is engaged. A leveling pair may selectively define an axis of engagement. The axis may be defined between the components. The axis may be defined in accordance with which one element of the lock or leveling pair engages another element of the lock or the leveling pair. Movement about an axis perpendicular to the axis of engagement may be precluded when the leveling pair is physically coupled along the axis. One or more leveling pairs may be selectively engaged to set the level (e.g., roll, tilt, or roll and tilt, etc.) of spherical joint 100. Due to variations in installment locations, it may be beneficial to set a roll, tilt, or roll and tilt of an accessory. For example, when mounting a camera to a windshield, the curvature of the windshield may affect the orientation of the camera. Depending on where and how the camera is mounted to the windshield, the curvature may impact an orientation of the camera. It may be desirable to have a field of view that is level with a horizon. Therefore, it may be desirable to set a roll, tilt, or roll and tilt of a camera to orient a field of view of a camera and accommodate various installation positions.

A leveling pair may be configured to selectively engage one or more components of a spherical joint at a time. A leveling pair may comprise magnetic components configured to engage one another in certain orientations. A leveling pair may comprise a protrusion and a depression configured to engage one another to limit movement of various components of a spherical joint. A protrusion may comprise a protruding element such as a set screw, a thumb screw, a ball plunger, a key, and any other protruding element configured to mate with a depression. A depression may comprise a recessed element such as a groove, a detent, a keyway, and any other recessed element configured to mate with a protrusion.

In various embodiments, a first leveling pair and a second leveling pair may be used to set the roll and tilt of an accessory. The first leveling pair and the second leveling pair may enable a user to level an accessory. For example, the first leveling pair and the second leveling pair may enable a user to align field of view 14 of camera 10 with a horizon. Engagement of the first leveling pair and the second leveling pair may limit rotation of a ball head relative to a collar about one or more axes.

In various embodiments, spherical joint 100 may comprise a first leveling pair configured to set rotation of ball head 40 relative to collar 20 about an axis, such as axis Y. The first leveling pair may comprise a first protrusion configured to engage a first depression. For example, the first leveling pair may comprise first groove 42-1 and first set screw 80-1. First groove 42-1 may comprise a slotted depression that arcs across the surface of ball 41. First set screw 80-1 may thread into first threaded hole 26-1 of collar 20. In a first engaged position, first set screw 80-1 may be engaged with first groove 42-1 to set rotation of ball head 40 along first groove 42-1. In a first engaged position, engagement of first set screw 80-1 with first groove 42-1 may prevent rotation of ball head 40 in a direction perpendicular to first groove 42-1. In a first engaged position or first constrained position, engagement of first set screw 80-1 with first groove 42-1 may prevent rotation of ball head 40 about an axis coplanar with (e.g., along) first groove 42-1. The first set screw 80-1 may be partially received by first groove 42-1 in the first constrained position. The axis may comprise a longitudinal axis and/or axis Z. In a first engaged position, the roll of camera 10 may be set. Movement of ball head 40 about axis Z and axis Y may be prevented in the first engaged position.

Prior to, or after, being placed in the first engaged position, the first leveling pair may be disposed in a first disengaged position. The first disengaged position may comprise the first set screw 80-1 provided through first threaded hole 26-1. The first disengaged position may comprise the first set screw 80-1 disposed external to first groove 42-1. In the first disengaged position or a first unconstrained position, the first leveling pair may permit a roll or pan of camera 10 to be adjusted. When the first leveling pair is disposed in the first disengaged position, collar 20 may be rotated about axis Y to adjust a roll of camera 10 and about axis Z to adjust a pan of camera 10. In the first disengaged position, first set screw 80-1 may be disengaged with first groove 42-1 to enable ball head 40 to rotate freely. In a first unconstrained position, first set screw 80-1 may be disengaged with first groove 42-1 to enable ball head 40 to rotate freely about axis Y, axis, Z, and axis X.

In various embodiments, spherical joint 100 may comprise a second leveling pair configured to guide rotation of ball head 40 relative to collar 20 about an axis, such as axis X. The second leveling pair may comprise a second protrusion configured to engage a second depression. For example, the second leveling pair may comprise second groove 42-2 and second set screw 80-2. Second groove 42-2 may comprise a slotted depression that arcs across the surface of ball 41. Second groove 42-2 may be orthogonal to first groove 42-1. Second set screw 80-2 may thread into second threaded hole 26-2 of collar 20. Second threaded hole 26-2 may be orthogonal to first threaded hole 26-1. In a second engaged position, second set screw 80-2 may be engaged with second groove 42-2 to set rotation of ball head 40 along second groove 42-2. In a second engaged position, engagement of second set screw 80-2 with second groove 42-2 may prevent rotation of ball head 40 in a direction perpendicular to second groove 42-2. In a second engaged position or second constrained position, engagement of second set screw 80-2 with second groove 42-2 may prevent rotation of ball head 40 about an axis coplanar with (e.g., along) second groove 42-2. The axis may comprise a longitudinal axis and/or axis Z. The second set screw 80-2 may be partially received by second groove 42-2 in the second constrained position. In a second engaged position, the tilt of camera 10 may be set. Movement of ball head 40 about axis Z and axis X may be prevented in the second engaged position.

Prior to, or after, being placed in the second engaged position, the second leveling pair may be disposed in a second disengaged position. The second disengaged position may comprise the second set screw 80-2 provided through second threaded hole 26-2. The second disengaged position may comprise the second set screw 80-2 disposed external to second groove 42-2. In the second disengaged position, the second leveling pair may not prevent a tilt or pan of camera 10 from being adjusted. In the second disengaged position or a second unconstrained position, the second leveling pair may permit a tilt or pan of camera 10 to be adjusted. When the second leveling pair is disposed in the second disengaged position, collar 20 may be rotated about axis X to adjust a tilt of camera 10 and about axis Z to adjust a pan of camera 10. In a second disengaged position, second set screw 80-2 may be disengaged with second groove 42-2 to enable ball head 40 to rotate freely. In a second unconstrained position, second set screw 80-2 may be disengaged with second groove 42-2 to enable ball head 40 to rotate freely about axis Y, axis, Z, and axis X.

In various embodiments, spherical joint 100 may comprise one or more locking pairs (e.g. locks) configured to limit (e.g., restrict, prevent, guide, etc.) movement of cup 30 relative to collar 20. One or more locking pairs may be selectively engaged to set the horizontal orientation (e.g., pan, etc.) of spherical joint 100. In various scenarios, it may be desirable to pan an accessory to capture a different scene. For example, a user may wish to pan a camera to an orientation perpendicular to a windshield to capture a scene directly in front of the windshield, such as when using the camera for ALPR. A user may wish to pan a camera to an orientation non-perpendicular to a windshield to capture a scene to the side of a windshield, such as when conducting a field sobriety test. Therefore, it may be desirable to set the horizontal orientation of a camera to accommodate various scenarios.

In various embodiments, a first locking pair may be used to set the pan of an accessory. The first locking pair may enable a user to pan (e.g., horizontally rotate) an accessory and set the orientation of the accessory. For example, the first locking pair may enable a user to pan camera 10 to a particular orientation. The first locking pair may limit rotation of a cup relative to a collar about an axis. The axis may comprise axis Z and/or a longitudinal axis.

In various embodiments, spherical joint 100 may comprise a first locking pair configured to couple rotation of cup 30 and collar 20. The first locking pair may comprise a third protrusion configured to engage a third depression. For example, the first locking pair may comprise first keyway 37-1 of cup 30 and third set screw 80-3. Third set screw 80-3 may thread into third threaded hole 26-3 of collar 20. Third threaded hole 26-3 may be orthogonal to first threaded hole 26-1. In a third engaged position, third set screw 80-3 may be engaged with first keyway 37-1 to couple rotation of cup 30 with rotation of collar 20. The third set screw may be received by both first keyway 37-1 and third threaded hole 26-3 to dispose spherical joint in a third engaged position. In a third engaged position, third set screw 80-3 may be engaged with first keyway 37-1 to prevent rotation of cup 30 relative to collar 20. In a third engaged position, the pan of camera 10 may be set. In a third disengaged position, third set screw 80-3 may be disengaged with first keyway 37-1 to enable cup 30 to rotate freely relative to collar 20. In embodiments, the first locking pair may be disposed parallel to an axis (e.g., axis 21) relative to a first leveling pair. The locking pair and the leveling pair may permit or prevent movement of at least one component of spherical joint 100 about an axis (e.g., axis 21), despite being disposed along a surface of collar 20 parallel to the axis.

In embodiments, upon engagement of any two of a first lock, a second lock, and a third lock, rotation of the ball head relative to the collar about the longitudinal axis is prevented. Each of these locks may respectively comprise a first leveling pair, second leveling pair, or a first locking pair. Further, and in examples, upon engagement of all three of the first lock, the second lock, and the third lock, movement of the ball head relative to the collar and the cup is prevented.

Figure 2A:
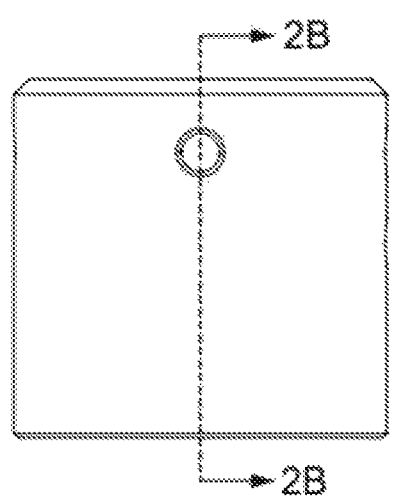
FIG. 2A is a side view showing a collar of a spherical joint, according to one or more aspects described herein.
Figure 2B:
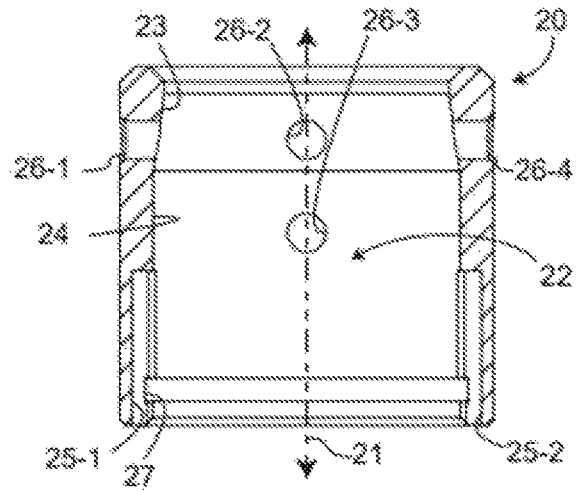
FIG. 2B is a cross section view of the collar of FIG. 2A along plane 2B-2B, according to one or more aspects described herein.

In various embodiments, and with reference to FIGS. 2A-2B, a collar 20 of a spherical joint 100 is disclosed. It should be understood by one skilled in the art that FIGS. 2A-2B are an example illustration of collar 20, and one or more of the components of collar 20 may be located in any suitable position within, or external to, collar 20. The components of collar 20 may be formed using any number of methods, such as casting, forging, molding, and machining. Collar 20 may at least partially enclose other components of spherical joint 100. For example, collar 20 may be configured to house cup 30, ball head 40, clutch 50, biasing device 60, retaining ring 70, and combinations thereof. In the example of FIGS. 2A-2B, collar 20 may comprise a body extending between a first end and a second end along axis 21 (e.g., longitudinal axis 21) and a cavity 22 (e.g., recess, chamber, etc.). Collar 20 and cavity 22 may be centered about axis 21 between the first end and the second end. The first end may be proximate threaded holes 26 of collar 20. The second end may be proximate groove 27 of collar. In embodiments, two or more threaded holes 26 may disposed in collar 20 in a direction parallel to axis 21. Cavity 22 may include one of a key and a keyway to couple rotation of collar 20 with clutch 50 as discussed herein.

In embodiments, cavity 22 may comprise a narrower diameter at a first end than at a second end proximate groove 27. Cavity 22 may comprise first diameter at the first end. The first diameter may be less than a diameter of one or more components selected from the group comprising cup 30, ball head 40, clutch, 50, and biasing device 60. Cavity 22 may comprise second diameter at the second end. The second diameter may be greater than a diameter of one or more components selected from the group comprising cup 30, ball head 40, clutch, 50, and biasing device 60. In accordance with a diameters, one or more elements selected from the group comprising cup 30, ball head 40, clutch, 50, and biasing device 60 may be received in cavity 22 via the second end. In accordance with this different in diameter, one or more elements selected from the group comprising cup 30, ball head 40, clutch, 50, and biasing device 60 may be prevented from being removed from cavity 22 via the first end. In examples, ball mount interface 44 may be received through second end of cavity 22 and further received through first end of cavity 22, but a diameter of ball 41 may prevent an entirety of ball head 41 from passing through cavity from the second end to the first end.

In embodiments, one or more components of assembly may be disposed concentric with each other. The one or more components may be concentric about an axis . For example, components of joint 100 may be concentric with axis 21 of cavity 22. For example, clutch 50 may be concentric with and disposed in cavity 22 of collar 20 between biasing device 60 and the cup 30. One or more of a group comprising collar 20, cavity 22, clutch 50, ball 41, first portion 31, cradle 32, second portion 33, and biasing device 60 may be concentric with another component of the group.

In embodiments, collar 20 may comprise a tapered region. The tapered region that may decrease in diameter in a direction away from the second end of the collar and toward the first end of the collar. The ball 41 of ball head 40 may be coincident with the tapered region. The tapered region may decrease in diameter at a constant rate. As illustrated in FIG. 2B, the tapered region may be disposed proximate one or more threaded holes 26. A thread hole (e.g., first threaded hole 26-1 or a fourth threaded hold 26-4) may be disposed through collar 20 within the tapered region. The tapered region may ensure ball 44 remains centered within cavity 22 and/or a fixed relative position within cavity 22. A position of ball 44 may be retained for different rotations of ball 44 within cavity in accordance with a shape and size of the tapered region relative to a shape and size of ball. In embodiments, a biasing force provided by biasing device 60 may be provided to the tapered region via ball head 40. A biasing force provided by bias device 60 may increase a frictional force between ball 41 and the tapered region of collar 20.

Figure 3:
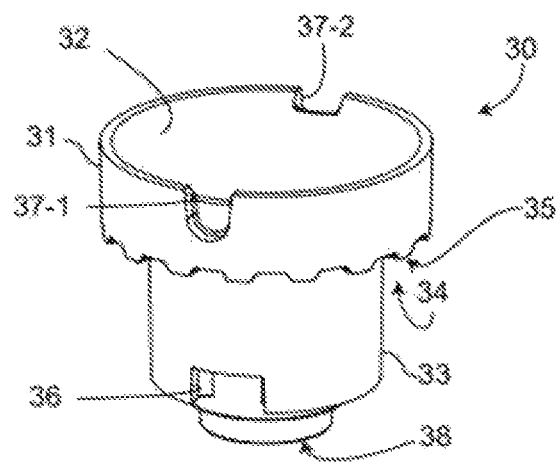
FIG. 3 is a front perspective view showing an implementation of a cup of a spherical joint, according to one or more aspects described herein.

In various embodiments, and with reference to FIG. 3, a cup 30 of a spherical joint 100 is disclosed. It should be understood by one skilled in the art that FIG. 3 is an example illustration of cup 30, and one or more of the components of cup 30 may be located in any suitable position within, or external to, cup 30. The components of cup 30 may be formed using any number of methods, such as casting, forging, molding, and machining. Cup 30 may be configured to cooperate with cup 30, ball head 40, clutch 50, biasing device 60, retaining ring 70, and combinations thereof. In the example of FIG. 3, cup 30 may comprise a body extending between a first end and a second end along an axis. Coupling cup 30 to collar 20 may align this axis between the first end and the second end with axis 21 of collar 20. The body may include a first portion 31 and a second portion 33. The first portion 31 may be disposed at the first end of the body of cup 30. The second portion 33 may be disposed at the second end of cup 30. The first portion 31 may comprise cradle 32. First keyway 37-1 may be disposed on first portion 31. Second keyway 37-2 may be disposed on first portion. The second portion 33 may releasably engage fastener 94. Cup 30 may be coupled to an accessory via the second portion.

In embodiments, cup 30 may comprise multiple diameters along an axis between a first end and a second end of a body of the cup 30. The diameter of the first portion 31 may be less than a diameter of cavity 22 of collar 20. In embodiments, a length of the first portion 31 along the axis may be less than a length of second portion 33 along the axis. The first portion 31 may have a greater diameter than the second portion 33. The second portion 33 may be received within biasing device 60. Biasing device 60 may enclose the second portion 33. Biasing device 30 may be disposed within collar 20 to apply a biasing force to the first portion 31. For example, the biasing force may be applied to a shoulder between different diameters of the first portion 31 and the second portion 33. A diameter of the second portion 33 may be less than a diameter of biasing device 60. A diameter of the second portion 33 may be less than a diameter of a cavity in biasing device 60. A diameter of the first portion 31 may be greater than a diameter of biasing device 60. Cup 30 may comprise a cup engagement surface 35 configured to engage a clutch engagement surface (e.g., clutch engagement surface 52 with brief reference to FIG. 5) as discussed herein. The biasing force from biasing device 60 may be applied to the first portion via the cup engagement surface 35. The first portion 31 may comprise cup engagement surface 35. Cup engagement surface 35 may be disposed between first portion 31 and second portion 33. may be disposed between first portion 31 and second portion 33. Cup engagement surface 35 may be oriented (e.g., facing, directed, etc.) along the axis. A biasing force may be received by the first portion 31 via the cup engagement surface 35.

Figure 4:
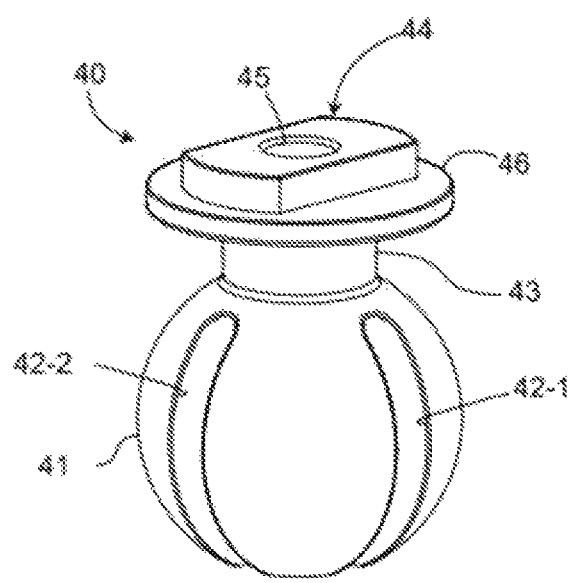
FIG. 4 is a front perspective view showing an implementation of a ball of spherical joint, according to one or more aspects described herein.

In various embodiments, and with reference to FIG. 4, a ball head 40 of a spherical joint 100 is disclosed. It should be understood by one skilled in the art that FIG. 4 is an example illustration of ball head 40, and one or more of the components of ball head 40 may be located in any suitable position within, or external to, ball head 40. The components of ball head 40 may be formed using any number of methods, such as casting, forging, molding, and machining. Ball head 40 may be configured to cooperate with cup 30, ball head 40, clutch 50, biasing device 60, retaining ring 70, and combinations thereof. In the example of FIG. 4, ball head 40 may comprise a body extending between a first end and a second end along an axis. Coupling ball head 40 to collar 20 may align this axis between the first end and the second end with axis 21 of collar 20. The axis of ball head 41 may intersect axis 21 in accordance with a relative position between collar 20 and ball head 40. The body may include a ball mount interface 44, and a ball 41. Ball mount interface 44 may be connected with ball 41 via a shaft, such as shaft 43. Ball mount interface 44 may be fixedly coupled to ball head 41 via shaft 43. The body may further comprise one or more grooves 42. For example, the body may comprise first groove 42-1 and second 42-1. The body may further comprise one or more opposing, additional grooves. For example, ball 41 may comprise first groove 42-1 and a third groove (not shown) disposed on ball 41 opposite first groove 47-1.

In embodiments, pairs of grooves 42 may be disposed along respective meridians of ball 41. For example, first groove 42-1 may be disposed along a first meridian on ball 41 and second groove 42-2 may be disposed along a second meridian on ball 41. The first meridian and the second meridian may each be parallel to an axis along the body of ball head 41 between a first end proximate ball mount interface 44 and a second end proximate ball 41. The first meridian may be orthogonal to the second meridian along the axis. The grooves 42 may be partially disposed along the respective meridians. The grooves 42 may be separate (non-intersecting). Each groove of the grooves 42 may comprise an elongated portion disposed along the respective meridian. Each groove of the grooves 42 may provide part of a different lock or locking pair. For example, a first lock may comprise first groove 42-1 and a second lock may comprise second groove 42-1. In embodiments, a lock may comprise an alternate or additional surface feature of ball 41, different from the one or more grooves 42.

In various embodiments, and with reference to FIG. 5, a clutch 50 of a spherical joint 100 is disclosed. It should be understood by one skilled in the art that FIG. 5 is an example illustration of clutch 50, and one or more of the components of clutch 50 may be located in any suitable position within, or external to, clutch 50. The components of clutch 50 may be formed using any number of methods, such as casting, forging, molding, and machining. Clutch 50 may be configured to cooperate with cup 30, ball head 40, clutch 50, biasing device 60, retaining ring 70, and combinations thereof. In the example of FIG. 5, clutch 50 may comprising a shape of a disc about an axis. Coupling ball head 40 to collar 20 may align this axis between the first end and the second end with axis 21 of collar 20. The body may include one of a key and a keyway to couple rotation of clutch 50 with collar 20. The key or keyway may be disposed at a periphery of clutch 50. The key or keyway may protrude or recede in a direction perpendicular the axis of clutch 50. The body may include an engagement surface, such as clutch engagement surface 52. Engagement surface 52 may be configured to cooperate with engagement surface 35 of cup 30 to provide a plurality of discreet possible orientations of clutch 50 relative to cup 30. The body may further comprise a contact surface 51 configured to engage with a biasing device. The contact surface may be disposed opposite engagement surface 52 on clutch 50. The contact surface 51 may couple a biasing force from the biasing device to the engagement surface 52. The biasing force may be provided to clutch 52 via the contact surface 51. The biasing force may be provided from clutch via engagement surface 52. In embodiments, clutch 50 may comprise an opening. Another component of spherical joint 100 may be received through the opening. For example, a second portion 33 of cup 30 may be received through the opening. A diameter of the opening (e.g., inner diameter) may be greater than an outer diameter of the second portion 33. A diameter of the clutch (e.g., outer diameter may be greater than the diameter of the second portion. The outer diameter may be less than a diameter of a cavity 22 of collar and/or less than a diameter of first portion 31 of cup 30 along axis 21.

In various embodiments, a spherical joint may comprise a rotational interface configured to permit movement about a single axis. The rotational interface may be partially engaged (e.g., locked, prevented from rotating about, etc.) along the axis in accordance with one or more locks of spherical joint 100. For example, a rotational interface may comprise cavity 32, a portion of ball 41 configured to rotatably engage cavity, first portion 31 of cup 31, and clutch 50. The portion of ball 41 and clutch 50 may be partially locked in accordance with engagement of a lock comprising one of first set screw 80-1 and second set screw 80-2; However, another portion of the rotational interface may be enabled to be rotated. For example, first portion 31 of cup 31 may be enabled to be rotated along the axis. Accordingly, the rotational interface may enable an accessory coupled to an interface of spherical joint 100 to be rotated via the rotational interface, despite rotation being prevented in other axes. Components of the rotational interface, such as engagement surfaces 35, 52 may enable this rotation to be controllably, incrementally provided.

Figure 6A:
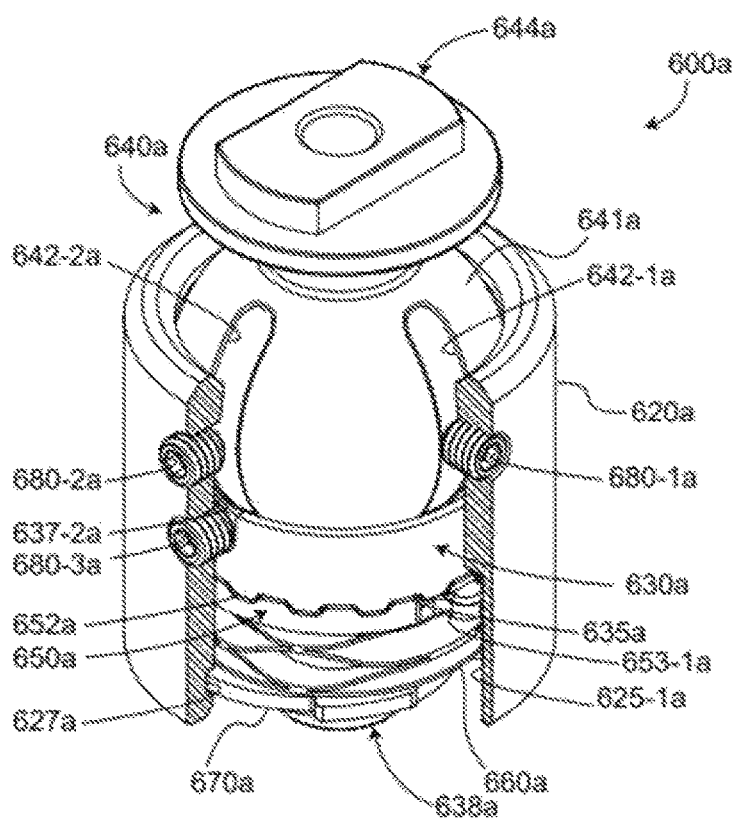
FIG. 6A is a front perspective breakout view showing an implementation of a spherical joint in a first configuration, according to one or more aspects described herein.
Figure 6B:
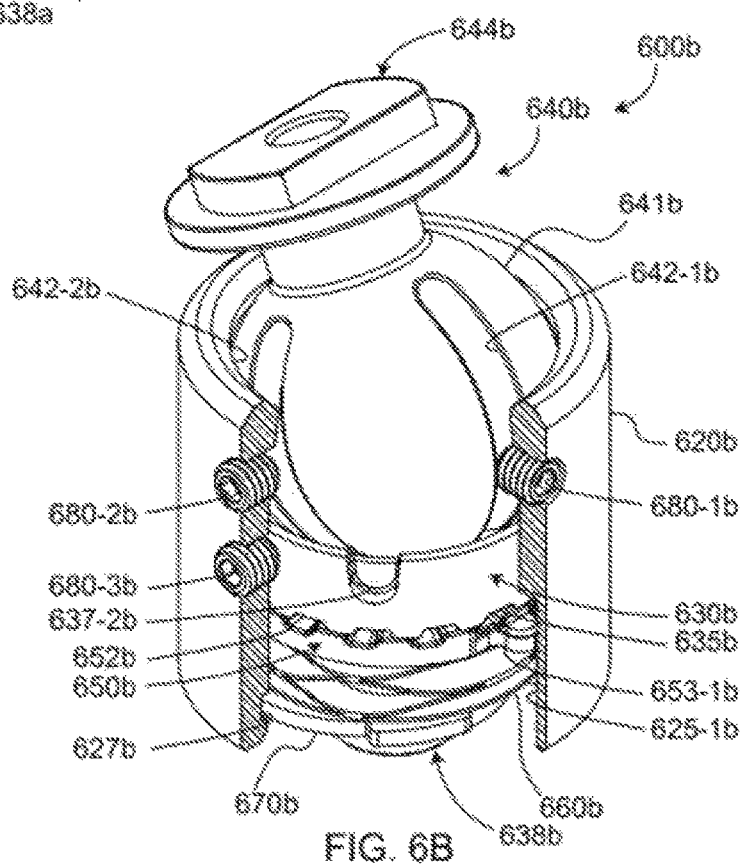
FIG. 6B is front perspective breakout view showing an implementation of the spherical joint of FIG. 6A in a second configuration, according to one or more aspects described herein.

In various embodiments, a spherical joint may transition from a first state to a second state. The first state may comprise a first physical state and the second state may comprise a second physical state. The second state may be different from the first state. One or more of a relative position and orientation of a same element or feature of the spherical joint may differ between the first state and the second state. For example, and in accordance with various aspects of the present disclosure, FIG. 6A shows a spherical joint, such as spherical joint 600a, in first state, whereas FIG. 6B depicts spherical joint 600b in a second state. In embodiments, spherical joint 600a may correspond to spherical joint 600b in a second state. Spherical joint 600b may correspond to spherical joint 600a in a first state. One or more elements or features of spherical joint 600a may correspond to one or more elements of spherical joint 600b. For the spherical joint illustrated in FIG. 6A, corresponding elements or features are referred to using similar reference numerals under the "6xxa" of reference numerals, rather than the "xx" as used in the embodiments of FIGS. 1A-5. For the spherical joint illustrated in FIG. 6B, corresponding elements or features are referred to using similar reference numerals under the "6xxb" of reference numerals, rather than the "xx" as used in the embodiments of FIGS. 1A-5. In embodiments, spherical joint 600a may comprise one or more of ball mount interface 644a, ball head 640a, second groove 642-2a, second set screw 680-2a, second keyway 637-2a, third set screw 680-3a, clutch engagement surface 652a, clutch 650a, collar groove 627a, retaining ring 670a, cup mount interface 638a, biasing device 660a, first keyway 625-1a, first key 653-1a, cup engagement surface 635a, cup 630a, first set screw 680-1a, collar 620a, first groove 642-1a, or ball 641a. Spherical joint 600b may comprise one or more of ball mount interface 644b, ball head 640a, second groove 642-2b, second set screw 680-2b, second keyway 637-2b, third set screw 680-3b, clutch engagement surface 652b, clutch 650b, collar groove 627b, retaining ring 670b, cup mount interface 638b, biasing device 660b, first keyway 625-1b, first key 653-1b, cup engagement surface 635b, cup 630b, first set screw 680-1b, collar 620b, first groove 642-1b, or ball 641b. In embodiments, spherical joint 100 may comprise spherical joint 600a and/or 600b, ball mount interface 44 may comprise ball mount interface 644a and/or 644b, ball head 40 may comprise ball head 640a and/or 640b, second groove 42-2 may comprise second groove 642-2a and/or 642-2b, second set screw 80-2 may comprise second set screw 680-2a and/or 680-2b, second keyway 37-2 may comprise second keyway 637-2a and/or 637-2b, third set screw 80-3 may comprise third set screw 680-3a and/or 680-3b, clutch engagement surface 52 may comprise clutch engagement surface 652a and/or 652b, clutch 50 may comprise clutch 650a and/or 650b, collar groove 27 may comprise collar groove 627a and/or 627b, retaining ring 70 retaining ring 670a and/or 670b, cup mount interface 38 may comprise cup mount interface 638a and/or 638b, biasing device 60 may comprise biasing device 660a and/or 660b, first keyway 25-1 may comprise first keyway 625-1a and/or 625-1b, first key 53-1 may comprise first key 653-1a and/or 653-1b, cup engagement surface 35 may comprise cup engagement surface 635a and/or 635b, cup 30 may comprise cup 630a and/or 630b, first set screw 80-1 may comprise first set screw 680-1a and/or 680-1b, collar 20 may comprise collar 620a and/or 620b, first groove 42-1 may comprise first groove 642-1a and/or 642-1b, or ball 41 may comprise ball 641a and/or 641b.

In the first state, ball head 640a is locked in a first orientation relative to collar 620a. One or more locking pairs of spherical joint 600a may be engaged to limit rotation of cup 630a relative to collar 620a and rotation of ball head 640a relative to collar 620a. In the second state, ball head 640b is locked in a second orientation relative to collar 620b. One or more locking pairs of spherical joint 600b may be engaged to limit rotation of cup 630b relative to collar 620b and rotation of ball head 640b relative to collar 620b. In the first orientation, ball mount interface 644a enables an accessory coupled to the spherical joint 600a to operate in the first orientation. For example, a camera accessory coupled to the spherical joint 600a may operate in the first orientation to capture images for an ALPR system or other system.

Responsive to the first orientation being unsuitable for the accessory to operate, e.g., due to obstruction of the accessory at the first orientation or a change in environment of the accessory, it may be beneficial for the spherical joint 600a to be adjusted to a second orientation, e.g., as in the example of the spherical joint 600b. The spherical joint 600a may transition to the orientation of spherical joint 600b by, for example, modifying or adjusting one or more of a relative position or orientation of one or more components or features of the spherical joint. In some embodiments, the spherical joint comprises one or more keys such as first key 653-1a and first keyway 625-1a, which may be configured to, when engaged, prevent rotation of clutch 650a relative to collar 620a. As such, transition of spherical joint 600a from first orientation to spherical joint 600b in second orientation may comprise disengaging, adjusting, and/or engaging key 653-1b and first keyway 625-1b in positions corresponding to the first and second orientations. Alternately or additionally, a lock comprising third set screw 680-3a and second keyway 637-2a may be disposed in a constrained position in spherical joint 600a, a lock comprising third set screw 680-3b and second keyway 637-2b may be disposed in an unconstrained position in spherical joint 600b. The transition from the constrained position to the constrained position may enable an accessory to be panned between different orientations in the first state and the second state. Alternately or additionally, clutch contact surface 352a and cup engagement surface 635a may be engaged in spherical joint 600a and clutch contact surface 352b and cup engagement surface 635b may be disengaged in spherical joint 600b. The transition from engaged to disengaged may enable an accessory to be panned between different orientations in the first state and the second state.

In other embodiments, relative components or features may comprise maintaining one or more of a relative position or orientation of one or more components or features of the spherical joint between different states of a spherical joint. For example, the spherical joint additionally or instead may comprise a retainer 670 configured to retain one or more components in collar 620. For example, retainer 670a may be coupled to grove 627a in a same position and orientation by which retainer 670 is coupled to groove 627b. Transition of spherical joint 600a from first orientation to spherical joint 600b in second orientation may comprise preserving retainer 670 (e.g., preserving retaining ring 670a in groove 627a) during adjustment of the one or more components of spherical joint system 600a and further preserving retainer 670 (e.g., preserving retaining ring 670b in groove 627b) to retain components in second orientation of spherical joint system 600b.

Responsive to spherical joint system 600 transitioning from first orientation to second orientation, spherical joint system 600 enables accessory coupled to the spherical joint 600b to operate in the second orientation. In other embodiments, first and second orientations as shown in FIGS. 6A and 6B may be oriented differently, e.g., correspond to different roll, tilt, or roll and tilt of ball mount interface 644, such that transitioning from a first orientation to a second orientation may correspond to different components than those shown herein, and may result in different orientations than those shown herein.

FIG. 7 is a flow diagram for a method for constraining rotation of the spherical joint system, according to one or more aspects described herein. It should be understood by one skilled in the art that the spherical joint system and components of the spherical joint system as described in conjunction with FIG. 7 may be any implementation of a spherical joint system as described throughout the Specification. For example, the method may be implemented by one or more of spherical joint 100, spherical joint 600a, or spherical joint 600b. Additionally, it should be understood by one skilled in the art that the method may comprise additional, fewer, or different steps, and the steps may be performed in a different order than described in conjunction with FIG. 7.

In some embodiments, aspherical joint system comprises a collar, a ball head, and a cup. The collar extends along an axis and comprises a cavity, wherein the cup is disposed in the cavity of the collar and the ball head comprises a ball coincident with the cavity of the collar.

In some embodiments, a first lock of the spherical joint system prevents 705 rotation of one of the cup or the ball head relative to the collar about the axis. In some embodiments, the first lock may comprise a protrusion configured to engage with a corresponding depression, e.g., wherein a cup or the a ball head comprises one of the protrusion or the depression, and wherein the collar comprises the other of the protrusion or the depression. For example, the first lock may comprise first set screw 80-1 and first groove 42-1 or third set screw 80-3 and first groove 27-1. In alternate or additional embodiments, the first lock may comprise a key and a keyway, e.g., wherein a cup or a ball head comprises one of the key or the keyway, and wherein the collar comprises the other of the key or the keyway. In other embodiments, the first lock may comprise any other mechanical, digital, or electrical interface between the cup and the collar configured to prevent rotation of the cup relative to the collar about the axis. A biasing device applies 710 a force (the "biasing force") on the cup to create a frictional force between a cradle of the cup and a ball of the ball head to resist movement of the ball relative to the cup. In some embodiments, the biasing device comprises one or more springs configured to impart a force on the cup in a direction toward the ball head. In some embodiments, the biasing force is configured such that unintentional movement of the ball head relative to the collar is prevented. In some embodiment, the biasing force is instead or additionally configured such that intentional movement of the ball head relative to the collar, e.g., by a user of the spherical joint system to adjust an orientation of the cup relative to the collar and/or the ball head, is enabled.

In some embodiments, a second lock of the spherical joint system prevents 715 rotation of the ball head relative to the collar about the axis. The second lock may be different from the first lock. For example, the second lock may comprise second set screw 80-3 and second groove 42-2. In some embodiments, the second lock may comprise a protrusion configured to engage with a corresponding depression, e.g., wherein the ball head comprises one of the protrusion or the depression, and wherein the collar comprises the other of the protrusion or the depression. In alternate or additional embodiments, the second lock may comprise a key and a keyway, e.g., wherein a cup or a ball head comprises one of the key or the keyway, and wherein the collar comprises the other of the key or the keyway. In other embodiments, the second lock may comprise any other mechanical, digital, or electrical interface between the cup and the collar configured to prevent rotation of the cup relative to the collar about the axis.

A first engagement surface of a clutch engages 720 with a second engagement surface of the cup. The clutch of the spherical joint system is configured to cooperate with the cup to enable the cup to rotate about the collar among discreet angular poses. The first engagement surface is, for example, a grouping of shapes (e.g., a series of detents) configured to interact with a corresponding grouping of shapes of the cup (e.g., a series of protrusions). In other embodiments, the first and second engagement surfaces may comprise one or more protrusions, depressions, ball plungers, detents, teeth, splines, or the like. The engagement of the first engagement surface of the clutch and the second engagement surface of the cup define one or more discrete angular steps by which the orientation of the cup may be adjusted. For example, the first engagement surface and the corresponding second engagement surface may comprise periodic or regular groupings of shapes, such as a periodic or regular set of detents or teeth. The periodic or regular groupings define the one or more discrete angular steps.

The cup rotates 725 about the axis relative to the collar in discrete angular steps to adjust the orientation of the cup relative to the collar. Responsive to the cup being rotated about the axis to a suitable position, e.g., such that an accessory coupled to the spherical joint system is positioned suitably to perform a corresponding function, a retainer such as a retaining ring may be used to secure components of the spherical joint system to prevent further rotation or movement as described in conjunction with FIGS. 1A and 1B. In other embodiments, other retaining mechanisms may be used to secure components of the spherical joint system.

In some embodiments, a third lock of the spherical joint system prevents 730 rotation of a second one of the cup or the ball head relative to the collar about the axis. The second one of the cup or the ball head may be different from the one of the cup and the ball head of the first lock. The third lock may be different from (e.g., comprise different components of the spherical joint) from the first lock and the second lock. In some embodiments, the third lock may comprise a protrusion configured to engage with a corresponding depression, e.g., wherein a cup or the a ball head comprises one of the protrusion or the depression, and wherein the collar comprises the other of the protrusion or the depression. For example, the first lock may comprise first set screw 80-1 and first groove 42-1 and the third lock may comprise third set screw 80-3 and first groove 27-1. Alternately, the third lock may comprise first set screw 80-1 and first groove 42-1 and the first lock may comprise third set screw 80-3 and first groove 27-1. In alternate or additional embodiments, the third lock may comprise a key and a keyway, e.g., wherein a cup or a ball head comprises one of the key or the keyway, and wherein the collar comprises the other of the key or the keyway. In other embodiments, the third lock may comprise any other mechanical, digital, or electrical interface between the cup and the collar configured to prevent rotation of the cup relative to the collar about the axis.

In embodiments according to various aspects of the present disclosure, a spherical joint for positioning an accessory is provided. The spherical joint may comprise a ball head, a collar, and a cup. At least one of the ball head, cup, or collar comprises an interface configured to couple to the accessory. The spherical joint may comprise a lock configured engage ball head with the collar along a first axis. The spherical joint may further comprise a rotational interface between the cup and the ball head. The spherical joint may enable rotation of the cup along a second axis. The second axis may be orthogonal to the first axis. The second axis may be perpendicular to the first axis. The rotational interface may comprise one or more of a clutch, cup engagement surface, or clutch engagement surface. The rotational interface may enable the cup to be rotated at discrete angular steps about the second axis. The spherical joint may further comprise a second lock configured to engage the ball head with the collar along a third axis. The third axis may be orthogonal and/or perpendicular to the first axis. The third axis may be orthogonal and/or perpendicular to the second axis. The spherical joint may further comprise a biasing device. The biasing device may be disposed along the second axis.

The biasing device may be configured to apply a biasing force between the cup and ball joint along the second axis. The rotational interface may be disposed between the biasing device and the cup. The cup may be disposed between the ball head and biasing device. The cup, biasing device, and rotational interface may be disposed along the second axis. The first lock may guide rotation of the ball head about the third axis. The third lock may guide rotation of the ball head about the first axis. Each of the first lock and second lock may comprise a respective indentation and respective protrusion. In embodiments, the spherical joint may comprise a third lock configured to lock rotation of the cup and the collar about the second axis. Rotation of the ball head relative to the cup about the second axis may be prevented by selectively engaging the first lock and the third lock. In embodiments, a system comprising an accessory and the spherical joint may be provided. The system may be configured to be coupled a vehicle via at least one of the ball head, collar, and cup. The accessory may comprise a camera. The camera may comprise an in-vehicle camera configured to capture an image through a windshield of a vehicle in which the system is mounted. In embodiments, the joint and/or system may comprise one or more features, components, and or operations disclosed in the context of FIG. 1-7.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosure is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B, and C may be present in a single embodiment; for example, A and B, A and C, B and C, or A and B and C.

Systems, methods, and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Examples of various exemplary embodiments embodying aspects of the invention are presented in the following example set. It will be appreciated that all the examples contained in this disclosure are given by way of explanation, and not of limitation.

What is claimed is:

1. A spherical joint comprising:
   a collar extending from a first end to a second end along an axis, the collar comprising a cavity;
   a ball head comprising a ball and a first attachment interface, the ball coincident with the cavity of the collar;
   a cup disposed in the cavity of the collar, the cup comprising a cradle and a second attachment interface opposite the cradle, the cradle coincident with the ball;
   a biasing device engaged with the cup, the biasing device applies a biasing force on the cup in a direction of the ball to create a frictional force between the cradle and the ball to resist movement of the ball relative to the cup;
   a first lock configured to engage the collar and the cup in a first locked position and disengage the collar and the cup in a first unlocked position, wherein:
     while in the first locked position, rotation of the cup relative to the collar about the axis is prevented; and
     while in the first unlocked position, rotation of the cup relative to the collar about the axis is permitted;
   a second lock configured to engage the collar and the ball head in a second locked position and disengage the collar and the ball head in a second unlocked position; wherein:
     while in the second locked position, rotation of the ball head relative to the collar about the axis is prevented; and
     while in the second unlocked position, rotation of the ball head relative to the collar about the axis is permitted; and
   a third attachment interface configured to couple with one of the first attachment interface of the ball and the second attachment interface of the cup to couple a vehicular camera with the spherical joint.

2. The spherical joint of claim 1, wherein the biasing device comprises a compression spring.

3. The spherical joint of claim 1, wherein:
   the cavity comprises a tapered region that decreases in diameter in a direction away from the second end of the collar and toward the first end of the collar; and
   the ball is coincident with the tapered region.

4. The spherical joint of claim 1, further comprising a retaining ring, wherein:
   the collar comprises a radial groove disposed at the second end of the collar; and
   the retaining ring sits in the radial groove to secure the biasing device, the cup, and the ball head to the collar.

5. The spherical joint of claim 1, wherein:
   upon engagement of only one of the first lock and the second lock, rotation of the ball head relative to the cup about the axis is permitted; and upon engagement of both of the first lock and the second lock, rotation of the ball head relative to the collar about the axis is prevented.

6. The spherical joint of claim 5 further comprising a clutch concentric with and disposed in the cavity of the collar between the biasing device and the cup, wherein rotation of the clutch is fixed about the axis relative to the collar, and wherein:
the clutch comprises a first engagement surface;
the cup comprises a second engagement surface that abuts the first engagement surface of the clutch; and
the biasing device applies the biasing force on the cup via the clutch to engage the first engagement surface with the second engagement surface.

7. The spherical joint of claim 1, further comprising a third lock configured to engage the collar and the ball head in a third locked position and disengage the collar and the ball head in a third unlocked position; wherein:
while in the third locked position, rotation of the ball head relative to the collar about the axis is prevented; and
while in the third unlocked position, rotation of the ball head relative to the collar about the axis is permitted.

8. The spherical joint of claim 7, wherein upon disengagement of the first lock and engagement of the second lock, the cup is configured to rotate about the axis relative to the collar in discrete steps, wherein each of the discrete steps comprises an angle of rotation, and wherein the angle of rotation of each of the discrete steps is defined by a shape of a first engagement surface of a clutch and a shape of a second engagement surface of the cup.

9. The spherical joint of claim 8, wherein the shape of the first engagement surface of the clutch comprises a first set of teeth and the shape of the second engagement surface of the cup comprises a second set of teeth complementary with the first set of teeth.

10. A spherical joint comprising:
a collar extending from a first end to a second end along a longitudinal axis, the collar comprising a cavity;
a ball head comprising a ball and a first attachment interface, the ball coincident with the cavity of the collar;
a cup disposed in the cavity of the collar, the cup comprising a cradle, a first engagement surface, and a second attachment interface opposite the cradle, the cradle coincident with the ball;
a biasing device engaged with the cup, the biasing device applies a biasing force on the cup in a direction of the ball to create a frictional force between the cradle and the ball to resist movement of the ball relative to the cup;
a clutch disposed in the cavity of the collar between the biasing device and the cup, wherein rotation of the clutch is fixed about the longitudinal axis relative to the collar, and wherein:
the clutch comprises a second engagement surface that abuts the first engagement surface of the cup; and
the biasing device applies a force on the cup via the clutch to engage the first engagement surface with the second engagement surface;
a first lock configured to engage the collar and the cup in a first locked position and disengage the collar and the cup in a first unlocked position, wherein:
while in the first locked position, rotation of the cup relative to the collar about the axis is prevented; and
while in the first unlocked position, rotation of the cup relative to the collar about the axis is permitted; and a third attachment interface configured to couple with one of the first attachment interface of the ball and the second attachment interface of the cup to couple a vehicular camera with the spherical joint.

11. The spherical joint of claim 10, further comprising a second lock configured to engage the collar and the ball head in a second locked position and disengage the collar and the ball head in a second unlocked position; wherein:
while in the second locked position, rotation of the ball head relative to the collar about the axis is prevented; and
while in the second unlocked position, rotation of the ball head relative to the collar about the axis is permitted.

12. The spherical joint of claim 11, wherein:
upon engagement of only one of the first lock and the second lock, rotation of the ball head relative to the cup about the axis is permitted; and
upon engagement of both of the first lock and the second lock, rotation of the ball head relative to the collar about the axis is prevented.

13. The spherical joint of claim 11, wherein:
upon engagement of only one of the first lock and the second lock, rotation of the ball head relative to the cup about the axis is permitted; and
upon engagement of both of the first lock and the second lock, rotation of the ball head relative to the cup about the axis is prevented.

14. The spherical joint of claim 11, further comprising a third lock configured to engage the collar and the ball head in a third locked position and disengage the collar and the ball head in a third unlocked position; wherein:
while in the third locked position, rotation of the ball head relative to the collar about the axis is prevented; and
while in the third unlocked position, rotation of the ball head relative to the collar about the axis is permitted.

15. The spherical joint of claim 11, wherein:
responsive to disengagement of the first lock and engagement of the second lock, the cup is configured to rotate about the axis relative to the collar in discrete steps defined by the clutch;
each of discrete step of the discrete steps comprises an angle of rotation; and
the angle of rotation of the discrete steps is defined by the first engagement surface of the cup and the second engagement surface of the clutch.

16. The spherical joint of claim 15, wherein the first engagement surface of the cup comprises a first set of teeth and the second engagement surface of the clutch comprises a second set of teeth complementary with the first set of teeth.

17. The spherical joint system of claim 11, wherein the second lock comprises a set screw coupled to the collar and a groove on a ball of the ball head.

18. The spherical joint of claim 10, wherein:
the cavity comprises a tapered region that decreases in diameter in a direction away from the second end of the collar and toward the first end of the collar; and
the ball is coincident with the tapered region.

19. The spherical joint of claim 10, further comprising a retaining ring, wherein:
the collar comprises a radial groove disposed at the second end of the collar; and
the retaining ring sits in the radial groove to secure the biasing device, the cup, and the ball head to the collar.

20. The spherical joint system of claim 10, wherein rotation of the cup around the longitudinal axis modifies an orientation of the cup in discrete angular steps relative to the collar, the discrete angular steps defined by cooperation between the first engagement surface of the cup and the second engagement surface of the clutch.

\* \* \* \* \*